United States Patent
Tessitore et al.

(10) Patent No.: US 8,103,550 B2
(45) Date of Patent: Jan. 24, 2012

(54) FAULT TOLERANT LOTTERY COMMUNICATIONS NETWORK, DEVICE, SYSTEM AND METHOD

(75) Inventors: David A. Tessitore, Warwick, RI (US);
David M. Bedard, Coventry, RI (US);
Christopher J. Maynard, Lincoln, RI (US)

(73) Assignee: GTECH Corporation, Providence, RI (US)

( * ) Notice: Subject to any disclaimer, the term of this patent is extended or adjusted under 35 U.S.C. 154(b) by 369 days.

(21) Appl. No.: 12/428,707

(22) Filed: Apr. 23, 2009

(65) Prior Publication Data

US 2010/0250380 A1 Sep. 30, 2010

Related U.S. Application Data

(60) Provisional application No. 61/163,516, filed on Mar. 26, 2009.

(51) Int. Cl.
*G06G 1/12* (2006.01)
*G06F 17/60* (2006.01)

(52) U.S. Cl. .......................................... 705/21; 705/39
(58) Field of Classification Search ................... 705/21
See application file for complete search history.

(56) References Cited

U.S. PATENT DOCUMENTS

| 5,119,295 A | 6/1992 | Kapur | |
| 2004/0054623 A1* | 3/2004 | Collins et al. | 705/39 |
| 2006/0287098 A1 | 12/2006 | Morrow et al. | |
| 2007/0093296 A1* | 4/2007 | Asher et al. | 463/42 |

OTHER PUBLICATIONS

International Search Report and Written Opinion, PCT Application No. PCT/US10/28771, May 26, 2010, U.S. Patent and Trademark Office.

* cited by examiner

*Primary Examiner* — Garcia Ade
(74) *Attorney, Agent, or Firm* — Williams Mullen, PC; Thomas F. Bergert

(57) ABSTRACT

A versatile and highly reliable lottery communications system employs point-of-sale terminals that can be adapted to a plurality of network technologies and service providers. The point-of-sale terminals are provided with at least two network-agnostic connecting devices to enable fast configuration regardless of the intended deployment environment. The point-of-sale terminals can be adapted to connect with multiple wireless networks at the same time, multiple wireline networks at the same time, and/or at least one wireless network and at least one wireline network at the same time, with failover and fallback programming to ensure maximum uptime for lottery operators and retail distributors.

16 Claims, 6 Drawing Sheets

FAULT TOLERANT LOTTERY COMMUNICATIONS NETWORK, DEVICE, SYSTEM AND METHOD

REFERENCE TO RELATED APPLICATIONS

This application claims the benefit of U.S. application Ser. No. 61/163,516, filed Mar. 26, 2009 and entitled "Fault Tolerant Lottery Communications Network, Device, System and Method", the disclosure of which is incorporated by reference herein in its entirety.

FIELD OF THE INVENTION

The present invention relates to lottery systems, and more particularly to a versatile and highly reliable lottery communications system employing point-of-sale terminals that can be adapted to a plurality of network technologies and service providers.

BACKGROUND

Lottery ticket sales generate large revenues for government-run programs. Typically, a lottery service provider, such as GTECH Corporation of Providence, R.I., will provide a lottery platform of systems and services to a lottery operator, such as a state or governmental body. The platform can include, for example, physical lottery terminals, which can be stand-alone kiosks and/or integrated point-of-sale terminals that enable both lottery and non-lottery transactions, as well as network connectivity, games management, transaction processing, accounting and other functions necessary to successfully conduct lottery operations. Lottery operators will typically authorize lottery sales agents to sell lottery tickets in exchange for a commission on overall sales and winning ticket sales. Lottery sales agents include common retailers, such as gas station and convenience store operators, who are typically provided with one or more of a variety of lottery-dispensing technologies covering various types of lottery games. For example, a 24-hour convenience store may have a point-of-sale (POS) lottery terminal behind the counter for management by a clerk, as well as a self-service lottery kiosk available to customers elsewhere in the store.

Terminals and kiosks are used for lottery game purchases as well as redemption activities, and these devices are connected by network connection to a lottery system backend such as a lottery data center having, for example, a lottery host and servers to process requests for various lottery-related transactions. The advantages to having an electronic network to receive and issue lottery information are many. First, the registration of purchased tickets ensures the lottery service provider knows important information, such as the exact number of winning tickets and their location of purchase, for example. Second, the lottery service provider can print special codes or provide elements of authentication to prevent unauthorized forgery or copying of lottery tickets. Third, the information recorded can provide valuable business management insight, such as what games are selling well in which locations and at which times, for example.

Past lottery systems have employed proprietary system architectures communicating over a "closed network." While such systems fulfill the requirements of high-performance lottery transaction engines, they do not allow for easy integration with outside networks. Such systems typically include applications and operating systems written in procedural languages, tightly integrated with their hardware platforms.

In recent years, networked lottery system that have enabled lottery service providers and sales agents with a simple means for incorporating lottery retail services and related management functionality. Such systems allow, for example, the lottery service provider to immediately address system management needs, such as activating or deactivating a lottery sales agent, initiating or discontinuing a particular lottery game, and isolating system network or fraud problems. However, one of the highest risk scenarios with lottery system networks occurs when there is a communications failure at an inopportune time, such as when lottery prize jackpot values are at extremely high levels, for example. This event is sometimes referred to as "Powerball Mania", when sales volume many times above the norm is experienced. In this case, the highest levels of revenue for the lottery service provider and the lottery operator are at risk. Another risk is when there is severe weather which may be impacting a particular communication circuit, such as VSAT, for example. Also, natural or other disasters or isolated accidental conditions may render one communications type unavailable. Further, a lack of power or impaired infrastructure facilities can result in network failure.

SUMMARY OF THE PRESENT INVENTION

The present invention provides a highly reliable, extremely secure, fast and standardized system that facilitates all of a lottery service provider's mission-critical business needs. In addition, the present invention provides a high availability and fault tolerant communications network, enabling nearly any combination of two network technologies, carriers and/or solutions to provide maximum network uptime, far exceeding the availability of each individual network type, and exceeding a lottery customer's availability requirements. The system of the present invention is also platform-, operating system- and database-independent.

DETAILED DESCRIPTION OF THE PREFERRED EMBODIMENTS

Figure 1:
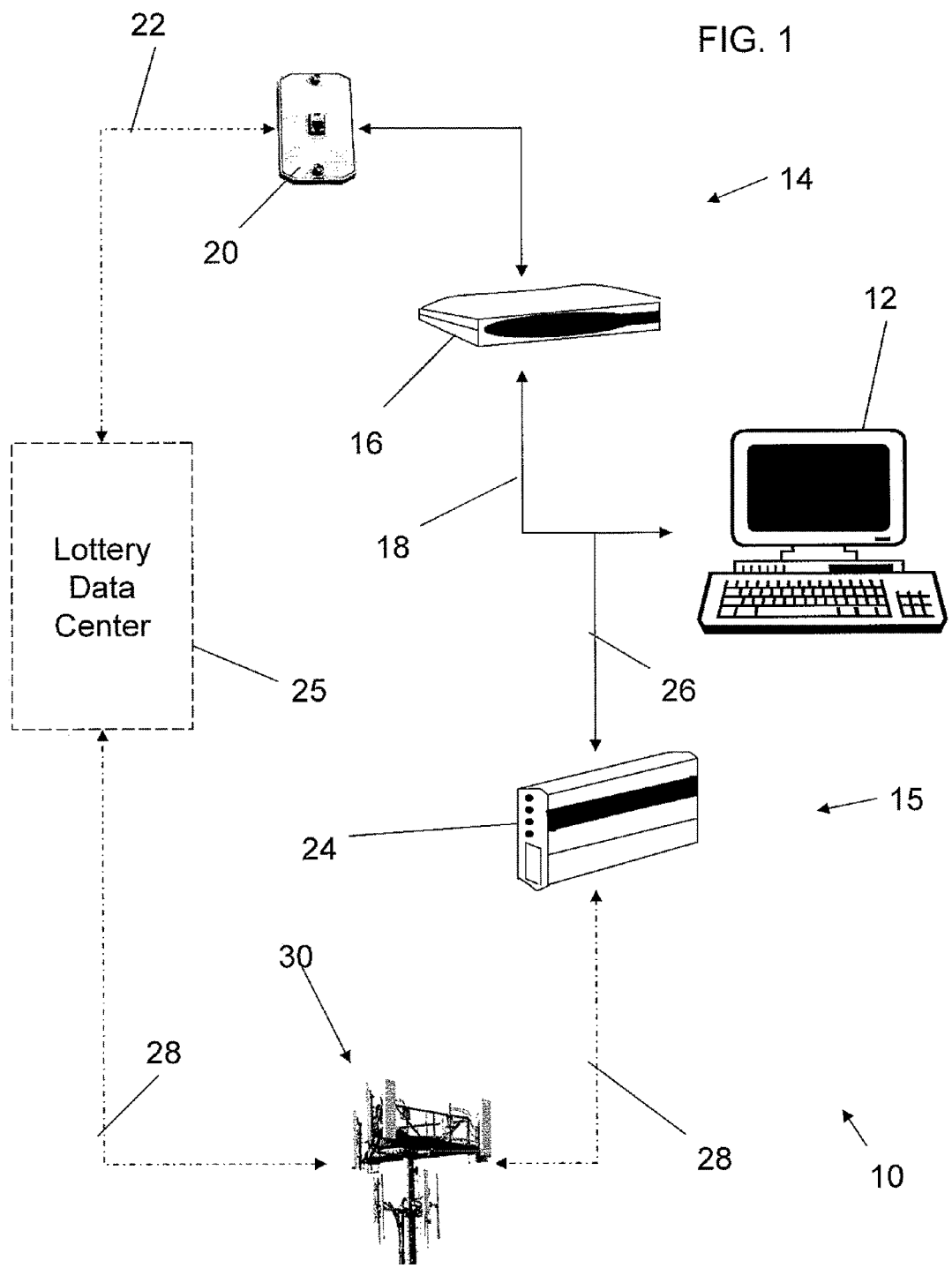
FIGS. 1 and 2 are sample architectural diagrams of different embodiments of the system of the present invention.
Figure 2:
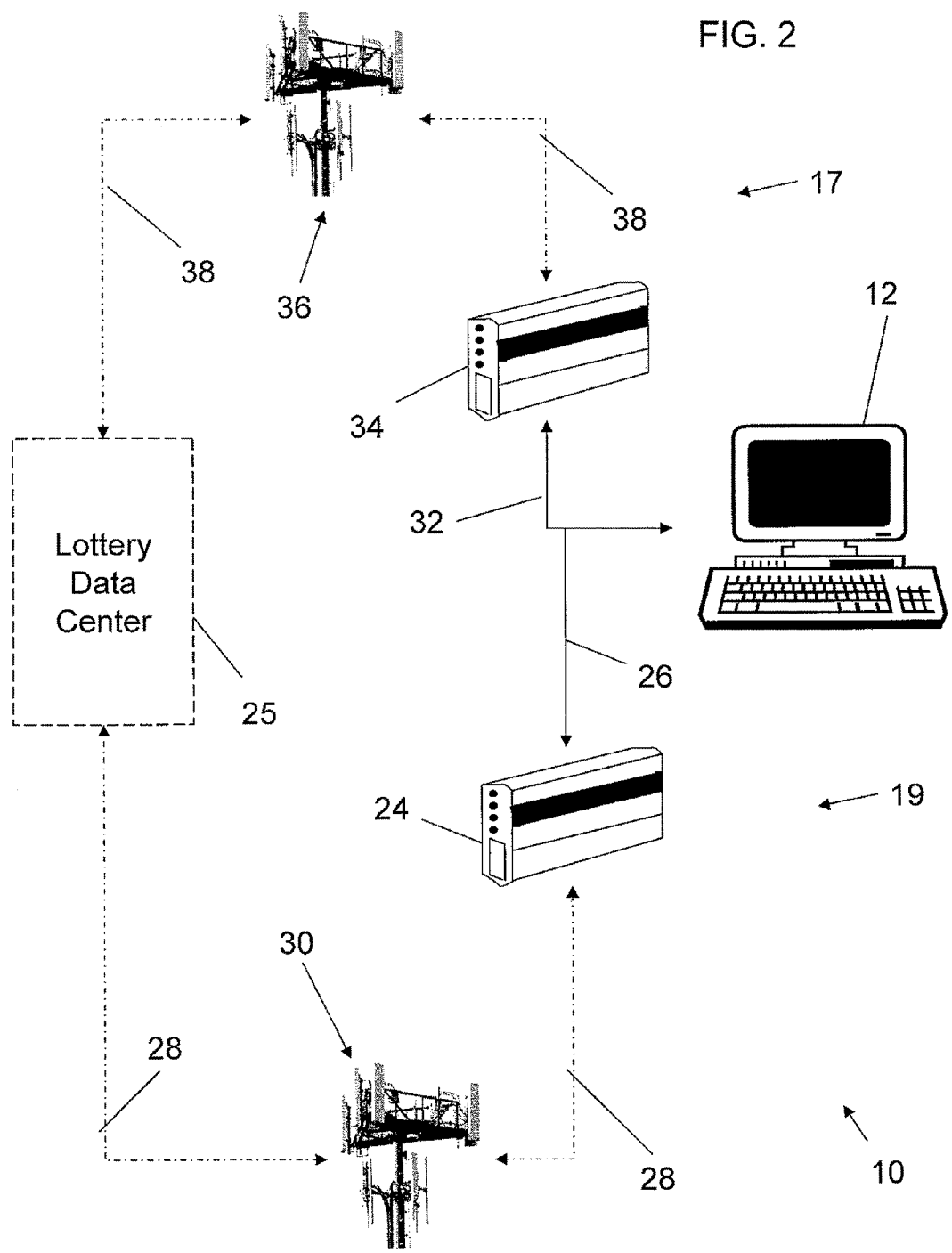

As shown in FIGS. 1 and 2, the present invention provides a high availability and fault tolerant system 10 for conducting lottery transactions. The system includes one or more retailer terminals 12 and two network configurations (14 and 15 in FIGS. 1, 17 and 19 in FIG. 2). While two network configurations are shown in each of FIGS. 1 and 2, it will be appreciated that the present invention can accommodate additional networks where required. Also, while it may be seldom necessary to invoke a tertiary network as a backup to the first two networks, one aspect of the present invention provides a versatile terminal capable of being employed with several different network types and devices, even if only two are employed at a given time.

As shown in FIG. 1, a first or primary network configuration 14 comprises a digital subscriber line (DSL) router 16 attached via cable 18 to the terminal 12. It will be appreciated that cable 18 and other "cable" connectors described herein can be CAT-5 E cable, Ethernet, USB and/or RS-232 connections as are known within the networking field. The DSL router 16 is further connected to a standard cable jack 20 to complete the connection to a DSL network 22. A secondary network configuration 15 comprises a backup cellular modem 24 connected via cable 26 to the retailer terminal 12. The modem 24 is further connected to a wireless network provider's network 28 through its associated infrastructure (e.g., element 30).

In the embodiment of the present invention shown in FIG. 2, the secondary network configuration 19 includes a similar configuration to that shown in FIG. 1, with backup cellular modem 24, cable 26 and connection to network 28 and associated infrastructure 30. However, the primary network configuration 17 in FIG. 2 employs a primary cellular modem 34 connected by cable 32 to terminal 12, while also being connected to a separate wireless network provider's network 38 through its associated infrastructure (e.g., element 36). The wireless network 28 is separate from wireless network 38 for reliability and fault tolerance purposes.

The networks 22, 28 and 38 enable communications with the lottery data center 25, which comprises the various devices and software necessary to facilitate lottery system operation. In one embodiment of the present invention, the router 16 and modems 24, 34 are maintained within the point-of-sale terminal housing. The router 16 and modems 24, 34 are examples of different network-agnostic connecting devices that may be employed in connection with the present invention.

The terminal 12 incorporates memory, a processor or central processing unit, one or more user interfaces and software that enables it to generate graphical user interfaces (GUIs) for lottery and non-lottery transactions. The user interfaces can include a keyboard, a mouse, a microphone, and/or a touch screen, for example. In one embodiment, the software is pre-stored on the terminal prior to delivery and installation. In another embodiment of the present invention, the software is made available from the lottery data center 25 through a network such as, for example, a virtual private network (VPN) or the Internet in certain jurisdictions, and the retail terminal incorporates browser software to provide the GUI for accessing and using the network-provided software.

Whether embodied as shown in FIG. 1 or 2, or otherwise, the present invention provides a high availability and fault tolerant communications network solution. The present invention enables the combining of nearly any combination of two network technologies, carriers and/or solutions to provide maximum network uptime, far exceeding the availability of each individual network type, and exceeding a lottery operator's (e.g., a state lottery's) availability requirements. The dual communication implementation in accordance with the present invention enables lottery distributors (e.g., retailers) to connect to the lottery data center 25 using one of the following exemplary but not exclusive dual communications network combinations: (1) DSL wireline and code division, multiple access (CDMA) wireless; (2) DSL wireline and general packet radio service (GPRS) wireless; and (3) CDMA and GPRS wireless.

With the present invention, the lottery retailer terminals 12 can use the most highly available network-type for their primary network connection, with a secondary network-type running in hot-backup configuration, for example. In the event there is a failure anywhere end-to-end within the primary network, or something that constitutes an unacceptable performance level (deemed a "failure" for purposes of the present invention), the terminal will automatically failover from that primary network to the secondary network. In one embodiment of the present invention, the failure of the primary network is detected using software programming that continually checks the availability of the primary network. Upon detecting a failure, the software then instructs the system to shift active communications over to the secondary network.

Through advanced and continuous automated analysis of the availability and reliability of both networks, the terminal falls back to the primary network when it is has been determined to once again meet its specified performance requirements. This entire process is unnoticed by the retailer.

In one embodiment of the present invention, the routing function is integrated directly into the point of sale terminal and the lottery server applications. As a result, the present invention achieves true ISO Layer 4 routing decisions. In this regard, the primary to secondary network failover and fallback routing logic is managed through direct negotiations between a communications client application of the POS terminal 12 and communications servers at the lottery data center 25. The network health probes, decision making and Internet Protocol (IP) connections are intelligently negotiated and managed end-to-end within lottery client and server communications in accordance with the present invention and are fully integrated within the monitoring tools within the application layer. As a result, simple low-priority Layer 3 ICMP ping-probes at the network-layer are avoided.

In addition, there is no single point of communications hardware failure. In one embodiment of the present invention, the local fail-over/fallback routing function is provided internally by the point of sale terminal (POS) itself. This eliminates the need for any additional external router or other appliance at the retail location, reducing the hardware complexity and retailer footprint while increasing the total system mean time between failure. Additionally, the primary and secondary network access devices and/or modems are fully independent of each other, not part of any single router or appliance. A failure in either device is isolated from the other. In one embodiment of the present invention, the terminal's fail-over logic will recognize any fault and automatically revert to the alternate communication device and network.

In the implementation of the present invention, all POS terminals can be installed with multi-communications capability. However, should any existing single communications retailer require the greater availability provided by the present invention, an additional network circuit cable can be plugged into the lottery terminal. Conversely, should a particular retailer no longer require the advantages of dual communications, one of the network access devices can simply be removed.

By eliminating the use of an external router at each dual communication retailer location, a considerable energy savings is also realized. A typical small office-home office (SOHO) router consumes on the order of 20 W of electric power. Assuming an installation with five thousand dual communications retailers, each operating twenty-four hours per day, a device incorporating the present invention will likely yield a daily savings of 2400 Kilowatt hours over an external router based solution, annually conserving over 876 Megawatt hours of electricity.

As illustrated herein, the present invention provides a greater availability than the sum of each individual technology. The theorem behind dual communication is exemplified below. The likelihood of both circuits being down at the same time is lower than either one taken by itself.

$T=100\%*(P+S*(1-P))$, where T=Total availability as a percentage of total running time, P=the percentage availability of the primary connection and S=the percentage availability of the secondary connection.

As an example, let's assume DSL is 99.800% reliable and wireless backup is 98.500% reliable:

$$T=100\%*(0.998+0.985*(1-0.998))$$

$$T=100\%*(0.998+0.985*(1-0.998))$$

$$T=100\%*(0.998+0.985*0.002)$$

$$T=100\%*(0.998+0.00197)$$

In this case, T=99.997%, which is greater than either VSAT (Very Small Aperture Terminal) or cellular alone. As another example, with two 98.500% reliable technologies the total availability would equal 99.978%.

In another embodiment of the present invention, the dual networks can operate using exclusively wireless connectivity, which facilitates the highest availability and most rapid deployment of any wide area networking technology. In one embodiment of this configuration, two diverse fixed wireless technologies are combined to allow for rapid connections to a highly-available lottery communications network. This embodiment provides near-immediate network communications as soon as the indoor mounted retailer hardware is installed. This embodiment works especially well for short term special events (e.g., fairs), last minute retailer additions or moves, high volume mobile applications (e.g., ferry boats, trains, buses and mass-transit lines), or for emergency or disaster recovery situations. It is most useful in situations where the highest availability is required, yet landline and/or VSAT technologies are not available or practical, such as, for example, metropolitan and urban retailer environments. This embodiment further provides an ideal communications solution for a lottery's promotional vehicles such as RVs, vans and buses, and can be used as a highly effective and rapidly deployable temporary, emergency or disaster recovery lottery solution.

In this embodiment, the present invention can use one wireless carrier and/or technology for the primary network circuit and a different combination for the secondary circuit. Transparent automatic switching between the two circuits is controlled by monitoring, which can be pre-built into the lottery system provider communications system. As with all dual communications implementations in accordance with the present invention, the sum of the network availability is greater than that of either individual circuit alone, with typical dual wireless network availability estimated to be 99.98%. In one embodiment of the present invention, two different wireless carriers or commercial providers with competing technologies can be used, for example, GPRS wireless technology from AT&T Inc., Dallas, Tex. and CDMA wireless technology from Verizon Communications of New York, N.Y. This ensures the use of different cell towers and completely independent infrastructure and data center backhaul circuits. In an alternative embodiment of the present invention, the present invention can deploy two different technologies with the same carrier or commercial provider, i.e. CDMA and IDEN wireless technology from Sprint Nextel Corporation, Overland Park, Kans., or the same technology from two different commercial providers, such as, for example, CDMA wireless technology from Sprint™ and Verizon™. These decisions are based on performance, coverage and business analysis for the specific target application to provide the best overall solution for the customer.

It will be appreciated that the DSL wireline network configuration can be replaced with cable modem, FiOS fiber, frame relay or even VSAT technology, depending upon the implementation. From the point of view of the terminal, these communication network connections can all be provided via a simple Ethernet connection to some appropriate "cable modem" or "set top box" type of router, for example. In one embodiment of the present invention, DSL may be selected and/or preferred despite its relative unreliability. In many markets, DSL is a low cost solution due to its unpredictable reliability. Nevertheless, it can be an ideal candidate for one of the networks for use with the present invention, as the reliability issue will be compensated for by the secondary communications circuit.

Figure 3:
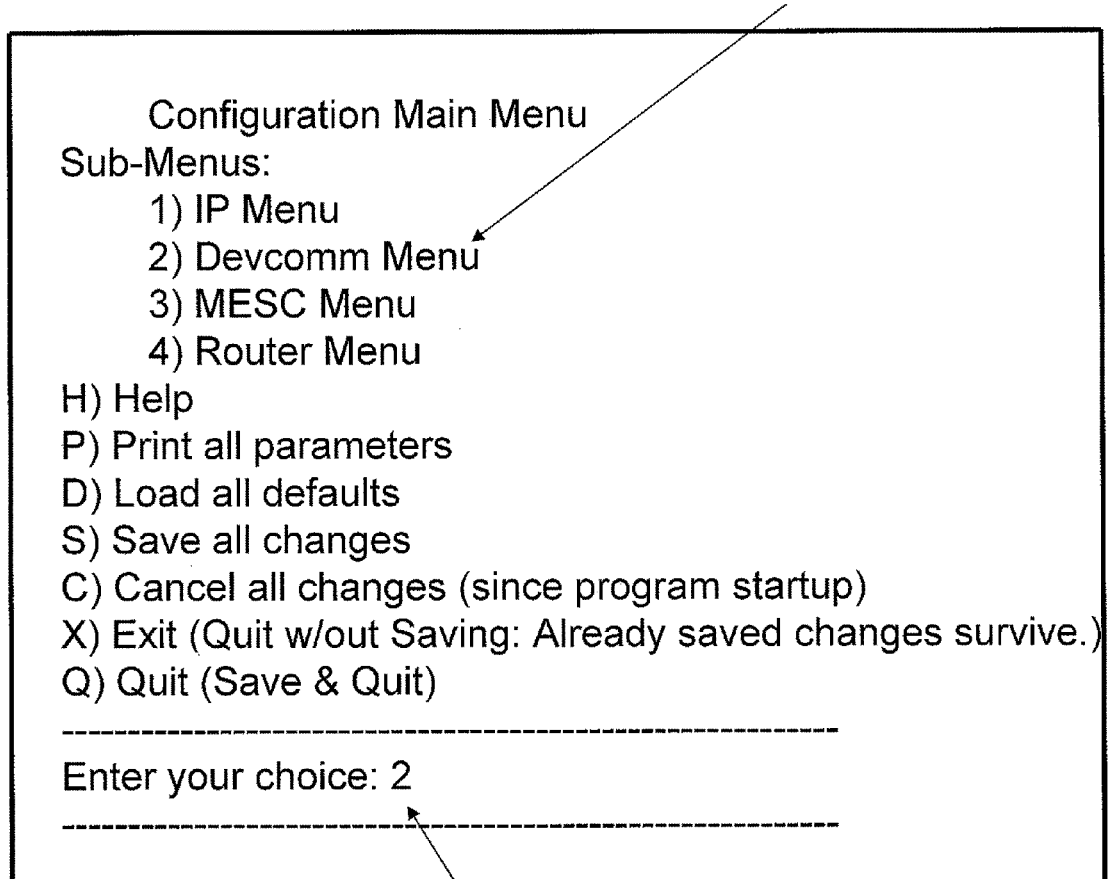
FIGS. 3 through 5 show sample interface menus for use with the present invention.
Figure 4:
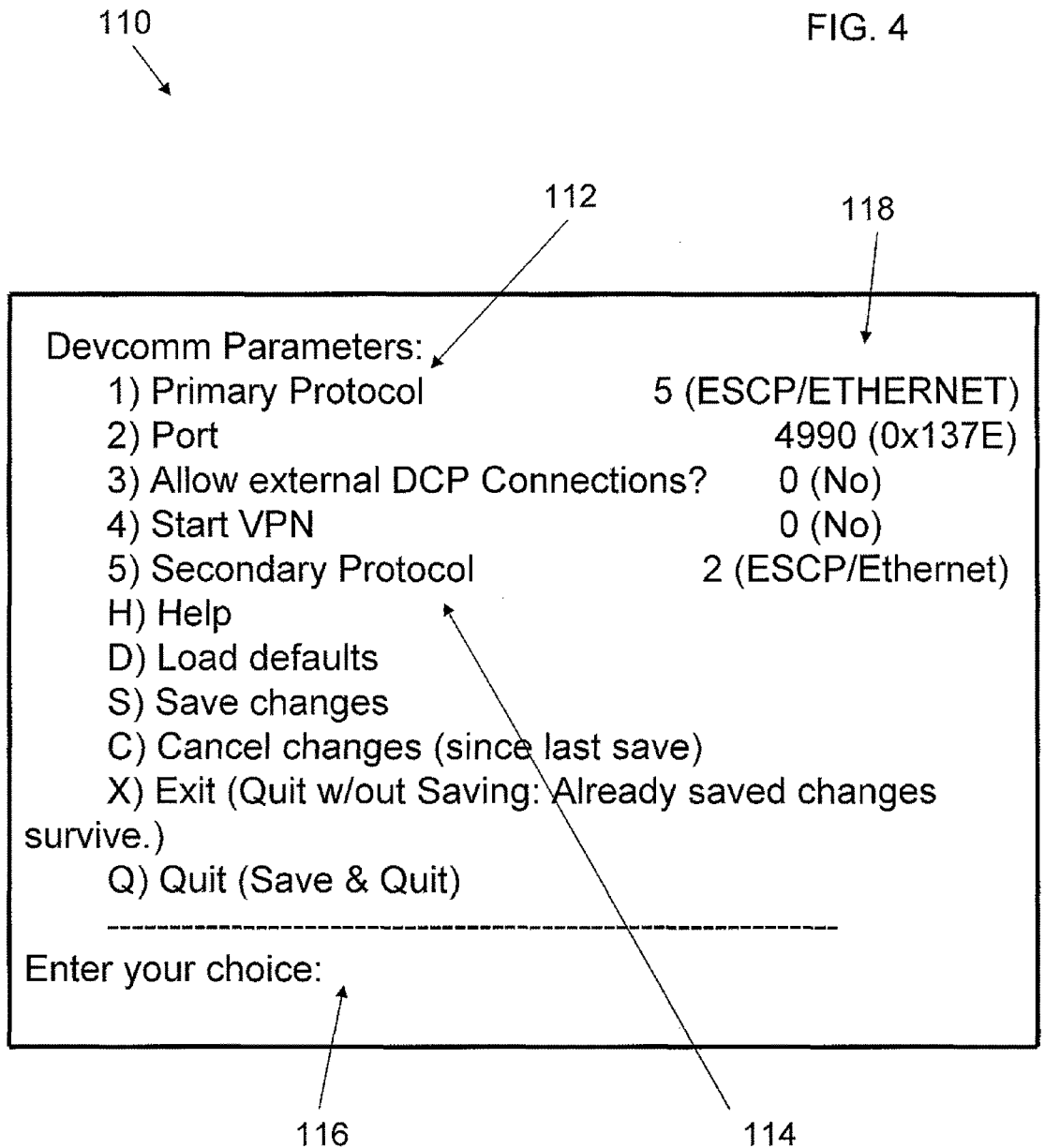
Figure 5:
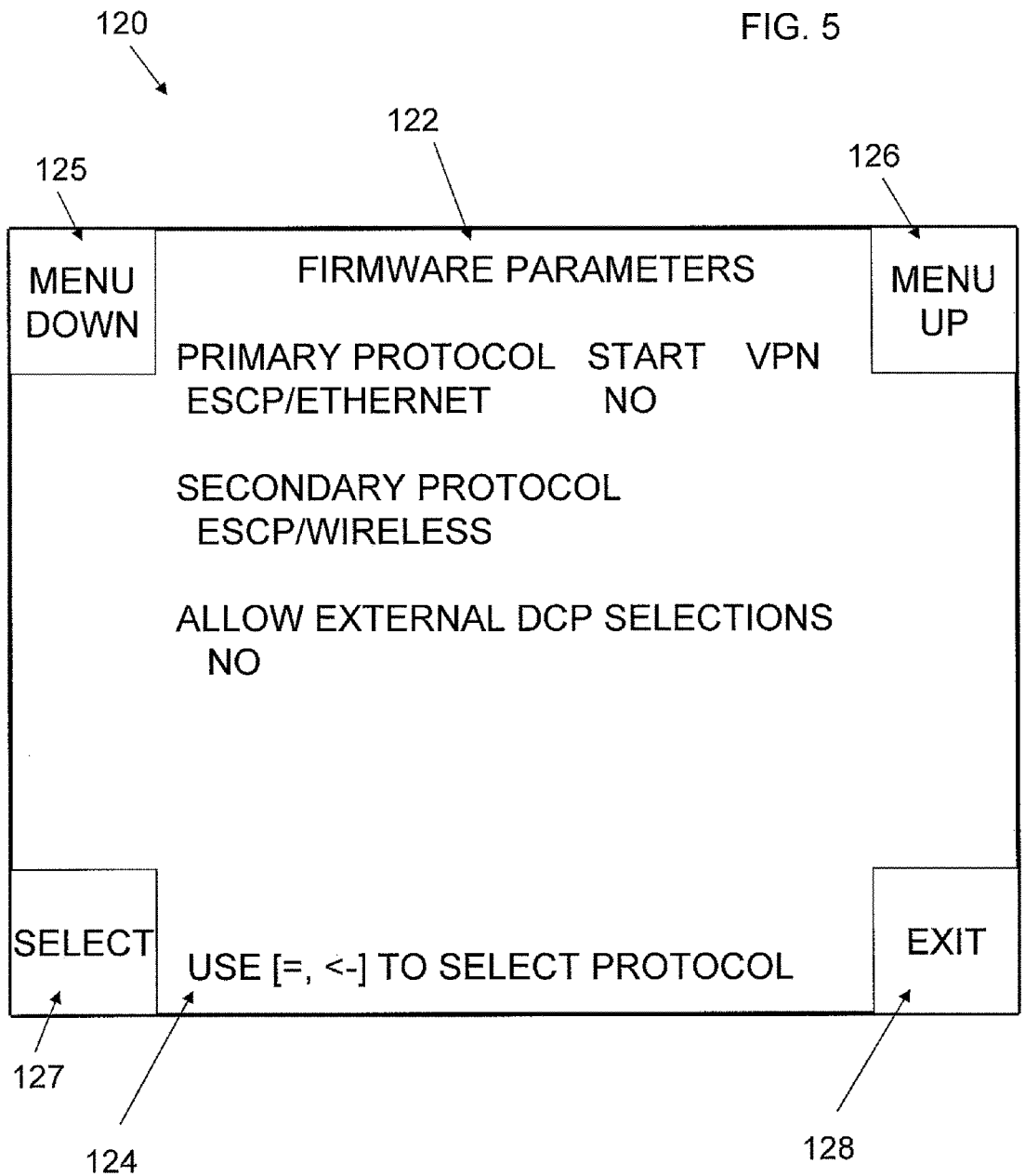

As shown in FIGS. 3 through 5, the POS terminals can allow the user/installer to select any combination of network options via various communications configuration set-up menus provided on the terminal GUI (100 in FIG. 3, 110 in FIG. 4 and 120 in FIG. 5). As shown on interface 100 in FIG. 3, the initial menu level can include selection options for various configurable elements, including an option for communications 102 (called "Dcvcomm"). Depending upon the interface, the screen can include a prompt as at 104 that permits the user to key in the number or letter being selected. In the embodiment shown in FIG. 3, the number "2" corresponds to the communications sub-menu.

Once in the communications sub-menu, an additional interface 110 can be provided as shown in FIG. 4. Interface 110 can receive a selection from a user of a primary protocol 112 as well as a secondary protocol 114 for communications. The primary protocol corresponds to the network, connections and devices to be employed for the primary network configuration and the secondary protocol corresponds to the network, connections and devices to be employed for the secondary network configuration. Selecting a number (e.g., at the prompt 116) allows for specific configurations to match the equipment installed with the terminal and the networks available at the deployment site. Current settings can be displayed as at 118 to enable the user to view and understand what the current configuration is without having to access more menu screens.

Interface 120 in FIG. 5 shows an alternative embodiment of a menu screen for viewing and selecting network configurations. The current parameters can be displayed as at 122, and instructions can be provided as at 124 for making changes. Further menu items can be provided as at 125, 126, 127 and 128 for navigation and configuration purposes. In one embodiment of the present invention, once a network configuration selection is made, software associated with the terminal proceeds to implement the selected network configuration with no further effort from the user, assuming the appropriate communications devices have already been installed as discussed below. As an alternative or supplemental option to a GUI, a keyboard, command line interface (CLI) or other user interface can be employed in order to configure settings or conduct lottery-related transactions.

It will be appreciated that the terminals can also generate GUIs for permitting lottery transaction selections. Software can be provided on the terminal or from the lottery data center 25 for administrative lottery functions, gaming selection functions, gaming purchase and redemption transactions and other lottery-related functions as are known, such as, but not limited to, those functions described in connection with U.S. Application Publication No. 2004/0242309, which is incorporated by reference herein in its entirety. Such operations can be generally referred to as lottery transaction selections for purposes of the present disclosure.

Each terminal can be pre-configured, such as in a factory prior to delivery to the installation site, or in a local service depot prior to installation or at any time at the retail location, for example. Plugging the appropriate modems into the terminal and then selecting the correct menu options for the particular devices can be handled in very short time periods. Once the connecting devices (e.g., modems, routers) are in place and the firmware configured, the network connection to the lottery data center 25 is established and active. In one embodiment of the present invention, access to the configuration menu can be password protected so as to limit access to authorized personnel. Upgrades and retrofits of existing terminals can be handled in this same manner.

Figure 6:
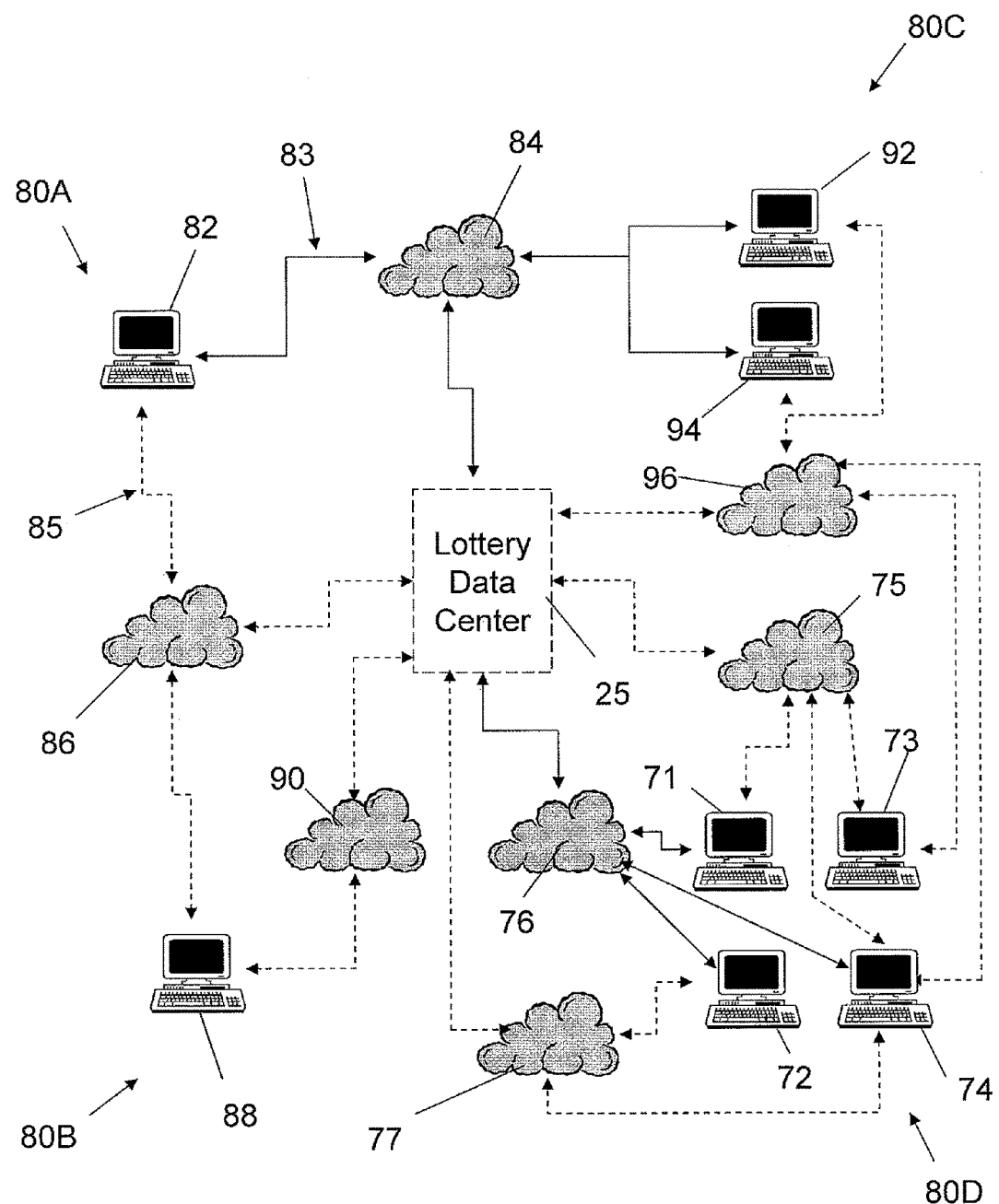
FIG. 6 is a schematic diagram illustrating multiple different terminal configurations and network connections in accordance with one embodiment of the present invention.

FIG. 6 is a schematic diagram illustrating multiple different terminal configurations and network connections in accordance with one embodiment of the present invention. For example, a lottery sales agent and/or distributor such as a retailer may have multiple stores in different geographic regions, each of which has a different physical layout resulting in a varying number of terminals and connectivity options. The stores indicated at 80A and 80B have a single terminal 82 and 88, respectively, while the store indicated at 80C has two terminals 92 and 94 and the store indicated at 80D has four terminals 71, 72, 73 and 74. Terminal 82 of store 80A can connect via wireline network 84 to the lottery data center 25, with the solid connector line 83 indicating a wireline configuration and not a wireless configuration. Terminal 82 is also shown with a second network connection to the lottery data center 25 via wireless network 86, with the dashed line connector 85 indicating a wireless connection. Terminal 88 is also shown with two network options for communicating with the lottery data center 25, including the wireless network 86 shared with terminal 82 and wireless network 90 accessed only by terminal 88. Thus, while store 80A is shown having a terminal 82 with one wireline and one wireless network connection to the lottery data center 25, store 80B has a dual wireless network connection solution.

As further shown in FIG. 6, the terminals 92 and 94 associated with store 80C have a wireline network connection via network 84 (shared with terminal 82 of store 80A), as well as a wireless connection to lottery data center 25 via network 96. The terminals 71-74 associated with store 80D have the greatest number of connectivity options, including wireless networks 75, 77 and 96 and wireline network 76. Terminal 71 is shown configured for one wireline connection and one wireless connection to the lottery data center 25 via networks 76 and 75, respectively. Terminal 72 is also shown configured for one wireline connection and one wireless connection to the lottery data center 25 via networks 76 and 77, respectively. Network 76 is shared between terminals 71 and 72. Terminal 73 is shown with two wireless network connections to the lottery data center 25 via networks 75 and 96. Terminal 74 is shown with four available network connections via networks 75, 76, 77 and 96. It will be appreciated that terminal 74 can include firmware (i.e., software and hardware) that enables it to employ all four network connection types and technologies associated with networks 75, 76, 77 and 96. For instance, if network 76 is a digital subscriber line network, terminal 74 can employ an appropriate DSL router and software such that network 76 identifies terminal and its router as being subscribers to the DSL service, thereby permitting the network connectivity to be active. Further, network 75 can be a CDMA wireless technology network offered by a first commercial provider, network 96 can be a GPRS wireless technology offered by the same first commercial provider, and network 77 can be a separate CDMA wireless technology network offered by a second commercial provider. It will be understood that the terminals may have firmware enabling it to connect to multiple network types with different technologies; however, the terminals and their network-connecting devices must be within radio range of the wireless networks in order to employ them. Regardless, the terminals in accordance with the present invention each include at least two network-agnostic connecting devices (e.g., router, modem) in order to benefit from the superior advantages of the system and network arrangement of the present invention.

Thus, as shown in FIG. 6, a large variety of arrangements can be invoked in accordance with the present invention. As such, terminals can be mass-built to fulfill a single order (e.g., for an entire state), whereupon the terminals are configured at their deployment site according to the available networks and configuration options. Multiple terminals can share a single network, and different terminals within the same retailer (even the same location) can have different configurations. Further, the terminals are not limited to two network connection options and may include a third or fourth; however, the additional security associated with a third or fourth "hot" network connection may be outweighed by the cost of keeping such additional options open.

It will be appreciated that, while a DSL wireline network combined with a CDMA wireless network may be a more common implementation option, other technologies and specific embodiments of technologies can be employed. For example, within a CDMA wireless network configuration, 3G technology called Evolution Data Optimized Revision A (EVDO Rev.A) technology can be employed. Further, DSL and/or CDMA with EDGE technology can be employed, or HSPDA. In deployments where absolute reliability takes precedence over cost, the primary network can be a VSAT network and the secondary network can be either CDMA or EDGE, for example. Further, the terminals can be easily and seamlessly upgradeable at any time to adapt to new 3, 3.5 and 4G wireless technologies as they evolve. In this way, the terminal becomes a more permanent solution that is not as susceptible to becoming outdated.

In this way, it will be appreciated that the present invention permits new lottery sales agents and/or retailers to be added at any time with no network modifications or changes. Further, the present invention is not affected by weather or communications provider (i.e., phone company, cable company) issues.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. Aspects of the present invention may be embodied in a computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example.

The invention may be embodied in other specific forms without departing from the spirit or essential characteristics thereof The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A lottery telecommunications system, comprising:
at least one lottery point-of-sale terminal having two or more network-agnostic connecting devices;
a first telecommunications network being either a wireline network including the at least one terminal as a subscriber or a wireless network having a radio coverage that includes the at least one terminal, with the first network being capable of communication with at least one of the connecting devices, the first network having performance standards associated therewith;
a second telecommunications network having a radio coverage that includes the at least one terminal and at least one of the connecting devices;
a terminal user interface for receiving lottery transaction selections and network configuration settings for the at least one terminal; and
programming associated with the at least one terminal for checking the availability of the first network and, upon detecting a failure of the first network to meet the associated performance standards, shifting terminal communication from the first network to the second network, and further shifting terminal communication from the second network to the first network upon detecting that the first network again meets or exceeds the associated performance standards.

2. The system of claim 1 wherein the first telecommunications network is a digital subscriber line wireline network and the second telecommunications network is a wireless network.

3. The system of claim 1 wherein the first telecommunications network and the second telecommunications network are wireless networks.

4. The system of claim 3 wherein the wireless networks are fixed wireless networks.

5. The system of claim 3 wherein the wireless networks each incorporate a wireless networking technology and wherein the wireless networks are provided by the same commercial provider, but wherein the wireless networking technology of the first telecommunications network is different from the wireless networking technology of the second telecommunications network.

6. The system of claim 3 wherein the first telecommunications network is provided by a first commercial provider and the second telecommunications network is provided by a second commercial provider, and further wherein both networks incorporate a wireless networking technology that is the same for each network.

7. The system of claim 1 wherein the terminal user interface is a command line interface or graphical user interface.

8. A method for establishing a high-reliability, low fault tolerant lottery point-of-sale communications network, comprising:
constructing at least one point-of-sale terminal with a user interface for receiving lottery transaction selections and network configuration settings;
installing at least two network-agnostic connecting devices in the at least one point-of-sale terminal;
selecting, using the interface, a low-reliability digital subscriber line network for connecting to a first one of the connecting devices, the digital subscriber line network having performance standards associated therewith;
selecting, using the interface, a wireless network for connecting to a second one of the connecting devices;
establishing a connection between the digital subscriber line network and a lottery data center;
establishing a connection between the wireless network and a lottery data center; and
providing programming associated with the at least one terminal for checking the availability of the digital subscriber line network and, upon detecting a failure of the digital subscriber line network to meet the associated performance standards, shifting terminal communication from the digital subscriber line network to the wireless network, and further shifting terminal communication from the wireless network to the digital subscriber line network upon detecting that the digital subscriber line network again meets or exceeds the associated performance standards.

9. A lottery point-of-sale terminal, comprising:
a processor associated with a terminal for processing lottery transaction requests and network configuration settings;
a first network-agnostic connecting device for connecting the terminal with either a wireline network including the terminal as a subscriber or a first wireless network having a radio coverage that includes the terminal;
a second network-agnostic connecting device for connecting the terminal with a second wireless network having a radio coverage that includes the terminal;
a user interface associated with the terminal for receiving lottery transaction selections and network configuration settings; and
programming associated with the terminal for checking the availability of the wireline or first wireless network and, upon detecting, a failure of the wireline or first wireless network to meet associated performance standards, shifting terminal communication from the wireline or first wireless network to the second wireless network and further shifting terminal communication from the second wireless network to the wireline or first wireless network upon detecting that the wireline or first wireless network again meets or exceeds associated performance standards.

10. The terminal of claim 9, wherein the user interface is a graphical user interface that provides a menu of available network configuration settings and wherein, upon receiving a selection of a desired setting, the processor establishes at least one network connection involving the first or second network-agnostic connecting device.

11. A lottery point-of-sale terminal network, comprising:
a plurality of lottery point-of-sale terminals, with each terminal having two or more network-agnostic connecting devices;
a first network-agnostic connecting device associated with a first terminal for connecting the first terminal with a first wireline telecommunications network including the first terminal as a subscriber;
a second network-agnostic connecting device associated with the first terminal for connecting the first terminal with a first wireless telecommunications network having at least one radio coverage that includes the first terminal and the second connecting device;
a third network-agnostic connecting device associated with a second terminal for connecting the second terminal with a second wireless telecommunications network having at least one radio coverage that includes the second terminal and the third connecting device;
a fourth network-agnostic connecting device associated with the second terminal for connecting the second terminal with a third wireless telecommunications network having at least one radio coverage that includes the second terminal and the fourth connecting device; and programming associated with at least the first terminal for checking the availability of the first wireline network and, upon detecting a failure of the first wireline network to meet the associated performance standards, shifting terminal communication from the first wireline network to the first wireless network, and further shifting terminal communication from the first wireless network to the first wireline network upon detecting that the first wireline network again meets or exceeds the associated performance standards.

12. The network of claim 11 wherein the first and second wireless telecommunications networks are the same network.

13. The network of claim 11 further including a lottery data center in communication with the first wireline telecommunications network and the first, second and third wireless telecommunications networks.

14. The network of claim 11 wherein each of the plurality of point-of-sale terminals includes programming for detecting a failure in the connection between at least one connecting device and at least one of the networks.

15. The network of claim 11 wherein the first, second and third wireless networks each incorporate a wireless networking technology and wherein at least the second and third wireless networks are provided by the same commercial provider, but wherein the wireless networking technology of the second wireless network is different from the wireless networking technology of the third wireless network.

16. The network of claim 11 wherein the second wireless network is provided by a first commercial provider and the third wireless network is provided by a second commercial provider, and further wherein the second and third wireless networks incorporate a wireless networking technology that is the same.

* * * * *